Oct. 15, 1957  D. KOSSEL  2,809,555
LIGHT RAYS DIVIDING SYSTEM
Filed Dec. 8, 1955  2 Sheets-Sheet 1

DIERICK KOSSEL INVENTOR.

2,809,555
LIGHT RAYS DIVIDING SYSTEM

Dierick Kossel, Wetzlar, Germany

Application December 8, 1955, Serial No. 551,926

4 Claims. (Cl. 88—39)

This application for patent is a continuation-in-part application of my pending application Serial Number 258,039, filed November 24, 1951, now abandoned, for improvements in light rays dividing system.

The object of this invention is to provide an optical light rays dividing system for use in binocular microscopes and other optical instruments to provide equal light intensity of the object as seen by the two eyes of the observer.

Before describing this invention in detail the following facts known to the art are set forth, namely that it is known from the Fresnel formulae that by partial reflection and transmission of a light beam by a surface of a transparent medium the light components vibrating parallel with ($p$) and perpendicular to ($s$) the plane of incidence emerge with different intensities and the reflected as well as the transmitted beam of light is partially polarized. See, for example, R. W. Wood, Physical Optics, 3rd edition, 1934, page 410, and P. Drude, Lehrbuch der Optik, 2nd edition, 1906, pages 268, 345.

It is also known in the art that the powers of reflection and transmission of light depends upon the thickness of the metallic beam splitting layer, and it is known how such light beam splitting layers are prepared, namely by depositing the metal under vacuum upon a glass plate or upon a prism surface until a photometer shows the same intensity of the transmitted as well as of the reflected light.

Throughout this specification and in the claims "$s$" stands for the light component vibrating perpendicular to the plane of incidence and "$p$" stands for the light component which vibrates parallel with the plane of incidence.

The components of the polarized or unpolarized incident light are designated $E_s$ and $E_p$, respectively. The reflected light components are designated $R_s$ and $R_p$. The transmitted light components are designated $D_s$ and $D_p$. The relation of the intensity of the reflected light components to the incident light components, $R_s/E_s$ and $R_p/E_p$ is the power of reflection of the beam splitting surface for the components $E_s$ and $E_p$, and the relation of $D_s/E_s$ and $D_p/E_p$ is the power of transmission of the beam splitting surface for the components $E_s$ and $E_p$. Inasmuch as the reflecting as well as the transmitting powers for the "$s$" and the "$p$" components are not equal, the emerging light beams are partially polarized. It is an object of the invention to equalize the four components $R_s$, $R_p$, $D_s$ and $D_p$. Referring now to the accompanying drawings Fig. 1 is a curve diagram illustrating the relation between the powers of reflection and transmission, as one factor, and the thickness of the metallic beam splitting layer, as the other factor.

In the following example it is shown that the intensities of the components emerging from the beam splitting layer are not equal. If the beam splitting layer is aluminum and if it be assumed that the intensity of each of the two components $E_p$ and $E_s$ of the incident light beam, polarized respectively parallel with and perpendicular to the plane of incidence, is 100, i. e. that the total intensity of the incident beam of non-polarized light is 200, then with such a known layer of aluminum the following intensities arise: $R_s=29$, $R_p=16$, $D_s=14$ and $D_p=31$. Thence: $R_s+R_p=45$ and $D_s+D_p=45$.

It will be observed that although the sum of the intensities of the polarized components of both partial light beams, each reaching into one of the oculars of a binocular microscope, are equal to each other, the intensities of the polarized components in each beam are different, one from the other. Such difference is very objectionable and may e. g. in a mineralogical microscope if the object is anisotropic cause an object to appear light in one ocular and dark in the other ocular.

Contrary thereto, it is one of the objects of this invention to provide a beam splitting device which converts an incident light beam into two partial light beams of substantial equal intensities.

It has been stated above that the powers of reflection and transmission of light depends upon the thickness of the metallic beam splitting layer. A beam splitting prism having a silver layer has been examined and the result of such examination is diagrammatically shown in Fig. 1, in which the abscissa represent the thickness of the layer and the power of transmission and reflection $R_s/E_s$, $R_p/E_p$, $D_s/E_s$ and $D_p/E_p$ are shown as ordinates for the four components. The diagram shown that the curves of the components $R_s/E_s$ and $D_p/E_p$ cross each other at a point corresponding to a certain thickness of the layer, and that the curves $R_p/E_p$ and $D_s/E_s$ cross each other at the same thickness of the layer. In other words, the two crossing points of the curves occur at points in the layer having substantially the same thickness. This fact may be utilized for the construction of an optical system providing four equal components.

Figure 1:
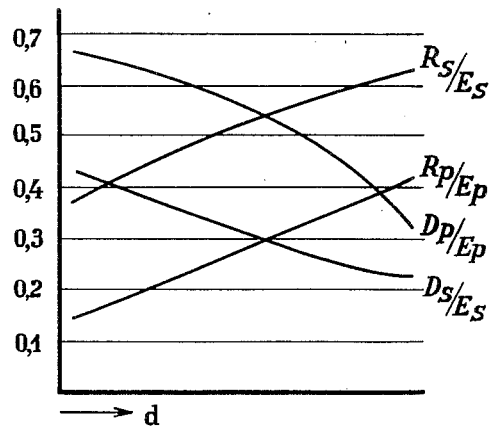
Figure 2:
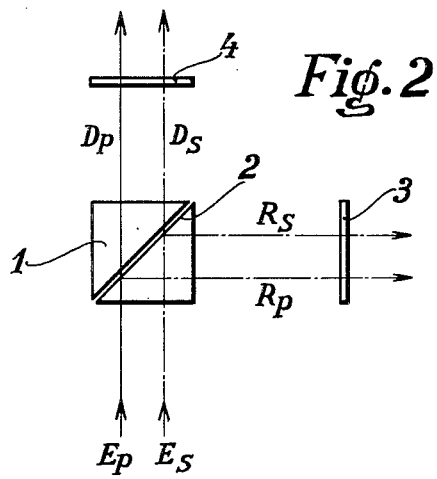
Fig. 2 is a diagram of an optical system embodying the invention.

Such an optical system is shown diagrammatically in Fig. 2, in which the reference numeral 1 designates the prism unit consisting of two prisms, the hypothenuse surfaces of which enclose a thin metallic layer which is of the thickness at which the curves according to Fig. 1 are crossing. The incoming one bundle of light rays is schematically shown as two components $E_s$ and $E_p$ side by side.

If the incoming light is unpolarized natural light, then $E_s=E_p$. If these two components are not equal, then the incoming light is polarized. The reflected components are designated $R_s$ and $R_p$ and the transmitted components are marked $D_s$ and $D_p$. Their intensities are not equal and for this reason the reflected as well as the transmitted bundle are polarized even when unpolarized light $E_s=E_p$ constitutes the incoming bundle of rays. In each of the bundle of rays is placed a polarizer, 3 and 4, respectively. It will be seen from Figs. 1 and 2 that the polarizer 3 may be so adjusted that behind this polarizer $R_s=R_p$, and that the polarizer 4 may be so adjusted that behind this polarizer $D_s=D_p$. If $E_s=E_p$, all four components become equal.

If it be assumed that the semi-transparent reflecting layer 2 consists of silver and has the thickness at which the curve graphs for $R_s/E_s$, $D_p/E_p$ and $R_p/E_p$, $D_s/E_s$ of Fig. 1, respectively intersect each other, and if the intensities of the components $E_p$ and $E_s$ are each assumed to be 100, then as will be recognized from Fig. 1, $R_p=30$; $R_s=55$; $D_p=55$; and $D_s=30$. The total intensity of the partial light beam transmitted through the semi-transparent reflecting silver layer 2 is therefore $D_p+D_s=85$, and the total intensity of the reflected partial light beam is $R_p+R_s=85$. Both partial light beams thus have the same total intensity, but in the transmitted partial light beam the component oscillating parallel to the plane of incidence preponderates, while in the reflected partial light beam the component perpendicular to the plane of incidence preponderates.

The intensities of all the four components of the two partial light beams can be rendered substantially equal to one another by the polarizers 3 and 4. In the example of the silver layer the polarizers form angles with the plane of incidence 53° 30′ and 36° 30′ respectively. The intensities of all the components are somewhat decreased by the polarizers. They are reduced to the same value of 19.5.

This loss of intensity may be reduced by using partial polarizers, e. g. stretched foils which are only slightly dyed.

This, in turn, means that the intensities of the two bundles of light beams produced by the light beam splitting system, namely the reflected bundles $R_s$, $R_p$ and the transmitted bundles $D_s$, $D_p$ are equal, one to the other, even when the incoming light is polarized, that is even when $E_s$ is not equal to $E_p$.

Figure 3:
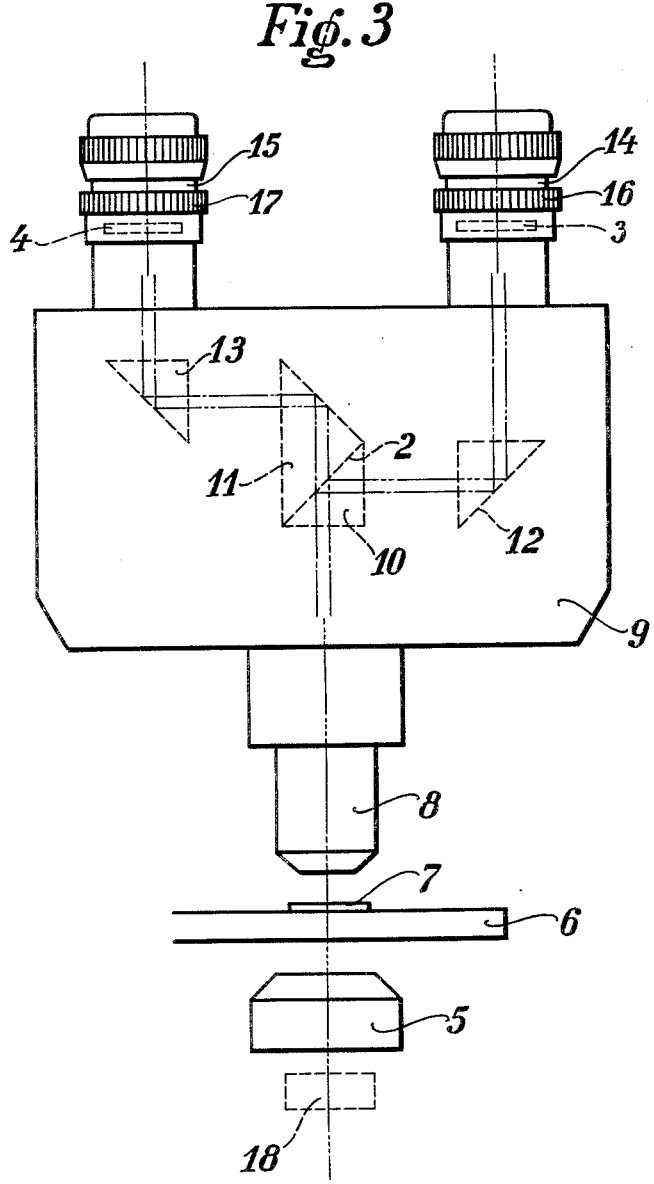
Fig. 3 is an outline view of a binocular microscope provided with an optical system embodying this invention.

Fig. 3 is a diagrammatic view of a binocular microscope equipped with the new optical system according to this invention. The optical system includes a condensor 5 below the stage 6 which supports the object 7. The objective 8 is supported below the general housing 9 and above the latter the two oculars 14 and 15 are supported. The housing 9 contains the prism 10 with the beam splitting layer 2 and a reflecting surface 11. The one light beam passes to the usual reflecting prism 12 and thence up into the ocular 14. The latter has a rotatable frame 16 which contains the polarizer 3. The other light beam passes from the reflecting surface 11 to the usual reflecting prism 13 and thence upward through the polarizer 4 which is supported in a rotatable frame 17. The polarizers 3 and 4 may then be adjusted by rotation of the frames 16 and 17.

If the microscope is to serve the purpose of a polarization microscope, for example for the examination for mineralogical purposes, a polarizer 18 will be used below the condenser.

It will be clear from the foregoing description and discussion that with a light beam splitting device according to the invention, the two emerging bundles of light rays have the same intensity.

I claim:

1. A light beam splitting device for use with binocular tubes to provide equal intensity of the two partial light beams emerging from said beam splitting device comprising a light beam splitting layer having a semi-transparent surface for splitting the incident light into two partial light bundles each partially polarized, said semi-transparent surface being a semi-transparent layer of such thickness that the one reflected component ($R_s$) which is polarized perpendicular to the plane of incidence is equal in light intensity to the one transmitted component ($D_p$) which is polarized parallel with the plane of incidence; and the other reflected component ($R_p$) which is polarized parallel with the plane of incidence is equal in light intensity to the other transmitted component ($D_s$) which is polarized perpendicular to the plane of incidence, the components $R_s$ and $R_p$ constituting the one partial light bundle, the components $D_s$ and $D_p$ constituting the other partial light bundle, and a polarizer positioned in each of the said two emerging bundles of light rays behind the beam splitting layer whereby to equalize the emerging four components in degrees of light intensity.

2. In a binocular microscope, an optical system providing equal illumination of the image of the object in the microscope oculars comprising a light beam splitting device having a semi-transparent reflecting layer for splitting the incident light beam into two partial light beams each partially polarized, said semi-transparent layer being of such thickness that the relative intensities of the two components polarized parallel with and perpendicular to the plane of incidence reflected by said layer and the two components correspondingly polarized transmitted by said layer are substantially equal to each other, and comprising optical means for reflecting one of the partial light beams into one of the oculars and for reflecting the other partial light beam into the other ocular, a partially polarizing body in each of the oculars in the path of the reflected partial light beam therein, and means in the oculars for adjusting the directions of polarization of said partially polarizing bodies to provide substantial equalization of intensity of the two partial light beams emerging from said beam splitting device independent of the polarization of the incident beam if the same is polarized or partially polarized.

3. A light beam splitting device according to claim 2 wherein each of the said two polarizing bodies is partially polarizing.

4. A light beam splitting device according to claim 3 wherein the said partially polarizing bodies are stretched foils which are weakly dyed.

No references cited.